United States Patent
Mobasher

(10) Patent No.: US 8,272,332 B2
(45) Date of Patent: Sep. 25, 2012

(54) SMART MASS TRANSIT RAIL SYSTEM

(76) Inventor: JP H. Mobasher, Fremont, CA (US)

( * ) Notice: Subject to any disclaimer, the term of this patent is extended or adjusted under 35 U.S.C. 154(b) by 0 days.

(21) Appl. No.: 12/817,042

(22) Filed: Jun. 16, 2010

(65) Prior Publication Data

US 2010/0319565 A1    Dec. 23, 2010

Related U.S. Application Data

(60) Provisional application No. 61/187,831, filed on Jun. 17, 2009.

(51) Int. Cl.
*B61B 3/00* (2006.01)
*E01B 25/26* (2006.01)

(52) U.S. Cl. ............... 104/96; 104/94; 104/105

(58) Field of Classification Search .......... 104/89, 104/90, 91, 94, 95, 96, 98, 108, 124, 130.04, 104/130.07, 242, 281, 282, 286; 16/87 R, 16/90, 91, 97, 106; 105/148, 154, 155
See application file for complete search history.

(56) References Cited

U.S. PATENT DOCUMENTS

| | | | | |
|---|---|---|---|---|
| 3,444,823 A | * | 5/1969 | Akmentin | 105/64.2 |
| 3,789,765 A | * | 2/1974 | Schultz | 104/96 |
| 3,830,163 A | * | 8/1974 | Wright et al. | 104/105 |
| 3,926,126 A | * | 12/1975 | Voss | 104/130.04 |
| 4,425,851 A | * | 1/1984 | Long | 104/20 |
| 4,793,263 A | * | 12/1988 | Basic et al. | 104/282 |
| 5,005,488 A | * | 4/1991 | Lainio | 105/148 |
| 5,465,668 A | * | 11/1995 | Tarassoff et al. | 104/95 |
| 7,314,008 B2 | * | 1/2008 | Li | 104/281 |
| 7,954,434 B2 | * | 6/2011 | Yeo et al. | 104/281 |
| 2007/0089636 A1 | * | 4/2007 | Guardo, Jr. | 104/281 |

* cited by examiner

*Primary Examiner* — S. Joseph Morano
*Assistant Examiner* — Zachary Kuhfuss
(74) *Attorney, Agent, or Firm* — Patent Service Associates; Lyman H. Smith

(57) ABSTRACT

An overhead mass transportation system for cities and urban areas may be particularly suitable for environmentally acceptable, or "green", systems because it can be used to produce power by an optional super solar system deployed, for example, over the tracks. The mass transportation system may meet many current economic and environmental needs. In many urban areas around the world, the mass transportation system can replace buses and taxis on the street, with their noise and pollution, and reduce the use of oil and fuel. The system can also be used for inter-cities transportation, where in can dispense with the need to carry large amounts of fuel for long distance transportation. The system may also be suitable for areas with challenged trains, such as those areas with a high level of floods, snow, or the like. Furthermore, the system may be suitable for desert transportation or transportation over waterways or between islands. The system can provide faster public transportation than buses and can operate where the streets are too crowded for ground transport, acting like an elevated freeway.

11 Claims, 3 Drawing Sheets

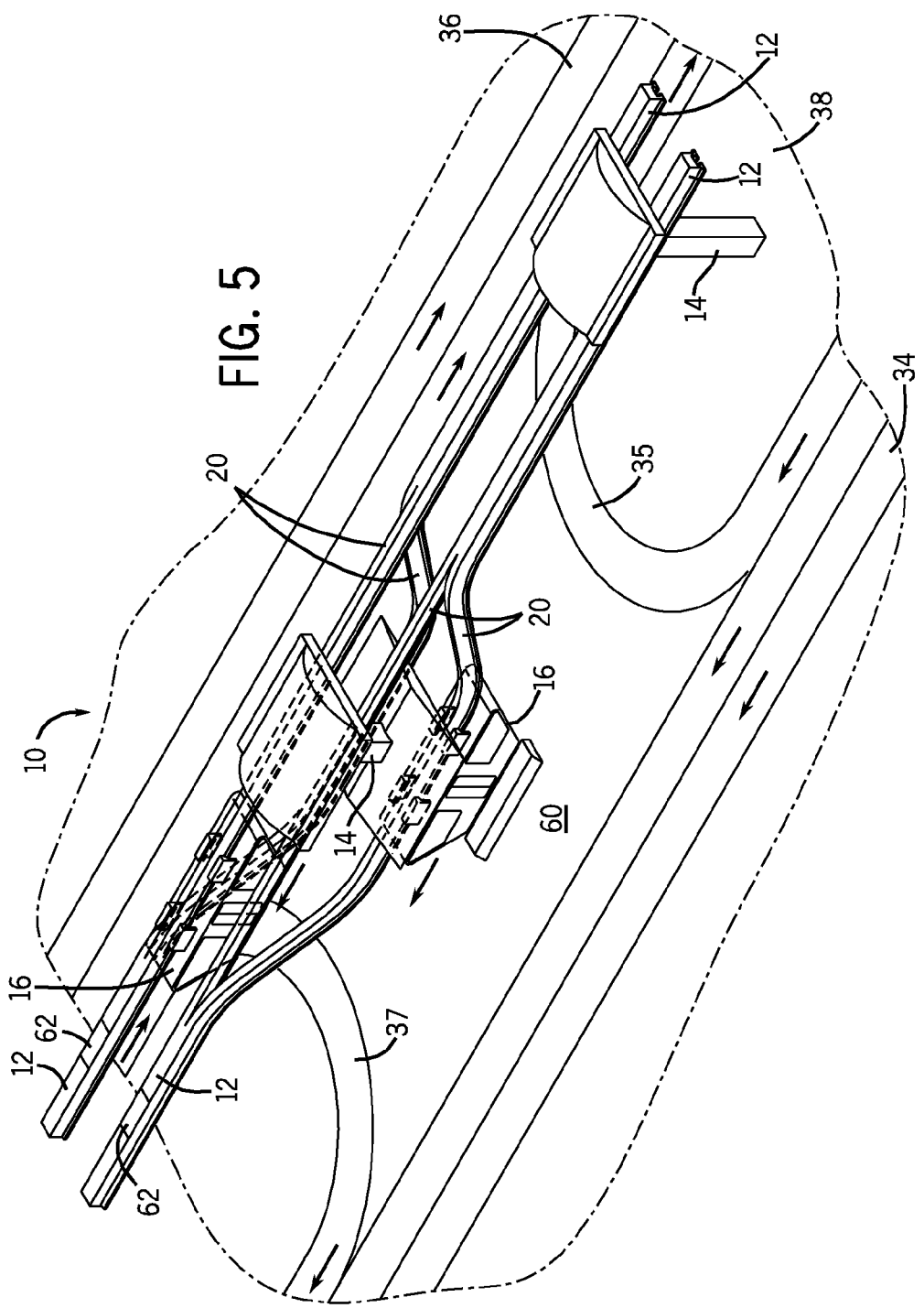

ously thought possible. Furthermore, the descending track system and ground stations may result in a system

SMART MASS TRANSIT RAIL SYSTEM

CROSS-REFERENCE TO RELATED APPLICATIONS

The present invention claims the benefit of U.S. Provisional patent application No. 61/187,831, filed Jun. 17, 2009, the contents of which are herein incorporated by reference.

BACKGROUND OF THE INVENTION

The present invention relates to transportation systems and, more particularly, to a smart mass transit (SMT) rail system that may use green technology and may be applied to, for example, an urban mass transportation system.

Public transportation is widely in use in all parts of the world, but it has its challenges. About 60 billion passenger journeys were made by public transport in 2008 in the European Union. Public transport ridership has increased steadily in the last 10 years in many countries. Between 2004 and 2008, ridership rose by about 11% in Spain, the United Kingdom and in the United States. Cities such as London and Brussels recorded particularly high ridership increases of about 20% during the same period.

Given the carbon footprint of individual modes of transportation and the rise of fuel cost increases, there is a greater need for public transportation, but there are serious hurdles in the deployment of light rail and buses cannot meet all the challenges. Light rail transit is an electric rail-borne form of transportation which can be developed in stages from a tramway to a rapid transit system operated partially on their own right-or-way. The general term "light transit" covers those systems whose role and performance lie between a conventional bus service running on the highway at one extreme and an urban heavy rail or underground metropolitan railway on the other. Light rail systems are typically flexible and expandable. Given the current recessionary environment and shrinking national, state and city budgets, light rail is facing an increased challenge to survive. Where there is enough ridership, issues of carbon footprint and speed of transport become relevant.

As can be seen, there is a need for a mass transit system that may have a small carbon footprint (as compared to, for example, buses) and may be scalable to transport varied amounts of passengers depending on deployment.

SUMMARY OF THE INVENTION

In one aspect of the present invention, a transportation system comprises an elevated track formed of at least one suspended I-beam; a platform adapted to be suspended from the track; a T-shaped arm extending from the platform; first and second switcher arms attached to the platform, wherein the first switcher arm and a first tip of the T-shaped arm is adapted to suspend the platform from a first suspended I-beam of the elevated track; and the second switch arm and a second tip of the T-shaped arm are adapted to suspend the platform from a second suspended I-beam of the elevated track.

In another aspect of the present invention, a transportation system comprises a plurality of overhead tracks suspended from towers, the tracks formed of at least one suspended I-beam; a plurality of ground-level stations; a T-shaped arm extending from a platform, the platform adapted to be attached to a top portion of a kart; and first and second switcher arms attached to the platform, wherein the first switcher arm and a first tip of the T-shaped arm are adapted to suspend the platform from a first suspended I-beam of the elevated track; the second switch arm and a second tip of the T-shaped arm are adapted to suspend the platform from a second suspended I-beam of the elevated track; and the first and second switcher arms and the T-shaped arm do not physically contact the suspended I-beam of the elevated track.

These and other features, aspects and advantages of the present invention will become better understood with reference to the following drawings, description and claims.

BRIEF DESCRIPTION OF THE DRAWINGS

FIG. 5 is a schematic perspective view of the transportation system of FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides an overhead mass transportation system for cities and urban areas. The system may be particularly suitable for environmentally acceptable, or "green", systems because it can be used to produce power by an optional super solar system deployed, for example, over the tracks. The system may also be suitable for areas with challenged trains, such as those areas with a high level of floods, snow, or the like. Furthermore, the system may be suitable for desert transportation or transportation over waterways or between islands. The karts, as described below, may be modified to carry not only passengers, but also cargo containers, automobiles or other goods between two points. The system of the present invention may be used not only in urban areas, but in any area that has a need for a smart transportation system, as described below. For example, the system may be used in airports, college campuses, businesses, and the like.

The mass transportation system according to embodiments of the present invention may meet many current economic and environmental needs. In many urban areas around the world, embodiments of the present invention can replace buses and taxis on the street, with their noise and pollution, and reduce the use of oil and fuel. The system of the present invention can also be used for inter-cities transportation, where in can dispense with the need to carry large amounts of fuel for long distance transportation. The system can provide faster public transportation than buses and can operate where the streets are too crowded for ground transport, acting like an elevated freeway. The descending track system connected to a low cost ground station, as described below, may eliminate the need for expensive elevated stations, such as monorails or the Ariel transportation systems. Furthermore, the descending track system and ground stations may result in a system that is fully handicap friendly. While the system of the present invention may be designed for a large transportation infrastructure, the system may be scaled down and adapted for use in theme parks or in the form of toys.

Figure 1:
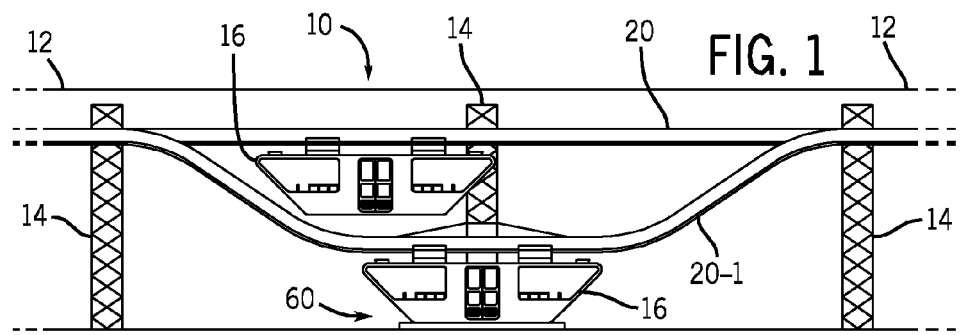
FIG. 1 is a side elevation view of a transportation system according to an embodiment of the present invention.

Referring to FIG. 1, a transportation system 10 may include single I-beam tracks 20 and double I-beam tracks 12. Typically, the tracks 20, 12 may be arranged to run substantially parallel to each other to permit transportation in opposite directions along the tracks 20, 12 simultaneously. In some embodiments of the present invention, a single track 12 may be included in the transportation system 10. For example, a single track 12 may be used to extend the transportation system 10 into less urban, or suburban, areas. The double I-beam tracks 12 may split into two single I-beam tracks 20 at, for example, a ground station 60. The two single I-beam tracks may include an upper track 20 and a descending track 20-1. The double I-beam tracks 12 may also split into single I-beam tracks 20 for turning the karts 16 at intersections, for example. After the station, or after an intersection, the single I-beam tracks 20 may rejoin to become double I-beam tracks 12.

A kart 16 may be adapted to ride on the tracks 20, 12. The tracks 20, 12 may be suspended from towers 14. The tracks 20, 12 may include descending tracks 20-1 for permitting the kart 16 to approach the ground. Descending tracks 20-1 may be used at stops in the transportation system 10, thereby permitting passengers to board and exit the karts 16.

Figure 2:
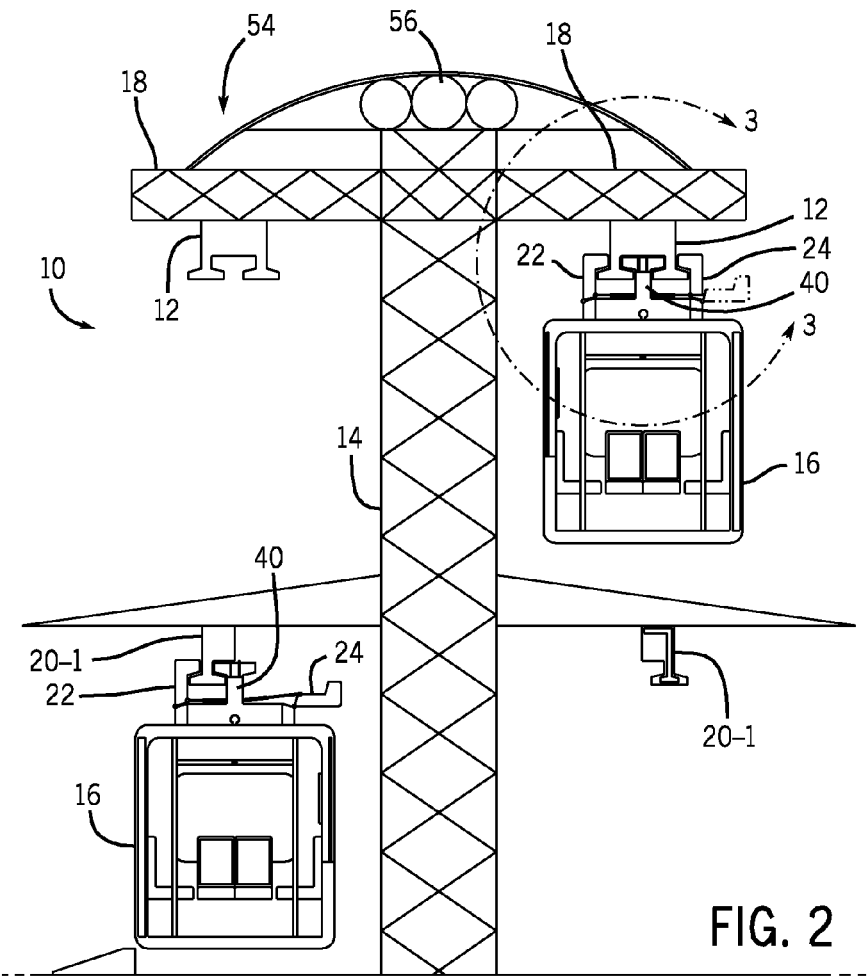
FIG. 2 is a cross-sectional view of the transportation system of FIG. 1.

Referring to FIG. 2, the tracks 12, 20 may be suspended from a tower arm 18 which may be mounted on the tower 14. The tower system, including the tower arm 18 and the tower 14, may be a made of a strong, high load capacity, lightweight material. The karts 16 may include a T-shaped arm 40 that may fit between the double I-beams of the tracks 12. Switcher arms 22, 24 may be disposed on left and right sides of the arm 40. Switcher arms 22, 24 may allow the karts 16 to travel along I beams on a straight line, up or down and turns left or right.

As shown in FIG. 2, the transportation system 10 may include a tower system 54 including the tower arm 18 and the tower 14. The tower system 54 may be adapted to carry all of a city's transmission lines 56, such as electric, phone, cable and similar transmission lines.

Figure 3:
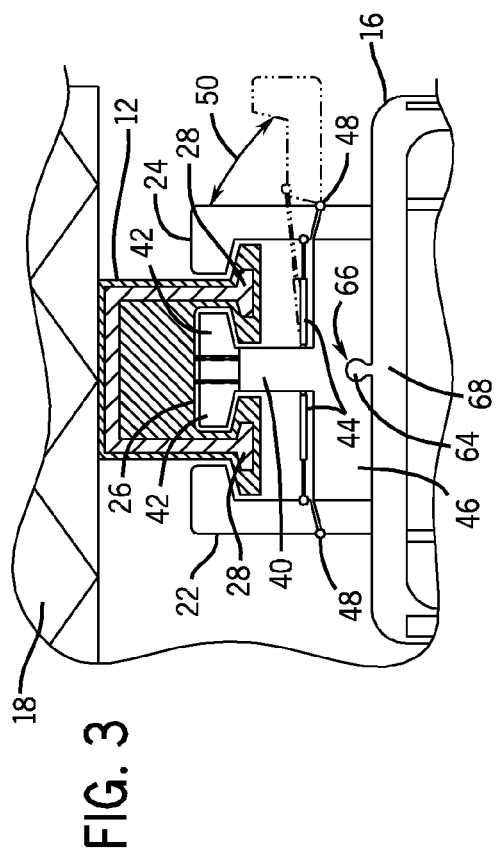
FIG. 3 is a detail cross-sectional view taken along line 3-3 of FIG. 2.

Referring to FIG. 3, the tracks 20, 12 may be negatively charged magnetic tracks. In one embodiment, an electromagnet 28 may be disposed within the tracks 20, 12. The switcher arms 22, 24 and tips 42 of the T-shaped arm 40 may also include charged electromagnets. These repulsive magnetic charges may cause the kart 16 to float on the tracks 20, 12, without a physical connection between the kart 16 and the tracks 20, 12. In an alternate embodiment, each of the magnetic charges in the tracks 20, 12, switcher arms 22, 24 and tips 42 may be positive charges. The electromagnets at the tips 42 of the T-shaped arm 40 may be rotating super electromagnets. The rotation of these electromagnets may control the speed of the kart 16 along the tracks 20, 12. In an alternate embodiment, a separate rotating super magnet may be disposed on the top of the kart 16 to power the kart 16 along the tracks 20, 12. The movement of the karts 16 along the tracks 20, 12 may be automated with a computer system (not shown). The karts 16 may typically move at speeds up to about 60 miles per hour or greater and may be noise-free.

The switcher arms 22, 24 may be pivotably attached to a platform 46 attached to the kart 16. The platform 46 may be attached to the kart 16 in any conventional manner. In one embodiment, the kart 16 may include a ball 64 formed in a top portion 68 of the kart 16. The ball 64 may fit into a socket 66 formed in the platform 46. In one embodiment of the present invention, the switcher arms 22, 24 may be attached to the platform 46 with hinges 48. First and second pistons 44 may be used to pivot the switcher arms 22, 24 from a traveling position, wherein the switcher arm 22, 24 is adjacent to an I-beam of the track, to a turning position, wherein the switcher arm 22, 24 is moved about 90 degrees away from the I-beam of the track, as shown by dashed lines and the arrow 50 in FIG. 3. In one embodiment, the pistons 44 may be pneumatic, hydraulic, magnetic or piezoelectric pistons. In a typical embodiment, the pistons may be piezoelectric pistons. The pistons 44 may be used to move one of the switcher arms 22, 24 to a turning position (dashed lines of FIG. 3), thereby permitting the kart 16 to make a turn or to descend onto a descending track 20-1, as shown in FIG. 1. In one embodiment, two or more pistons 44 may be attached to each switcher arm 22, 24.

Figure 4:
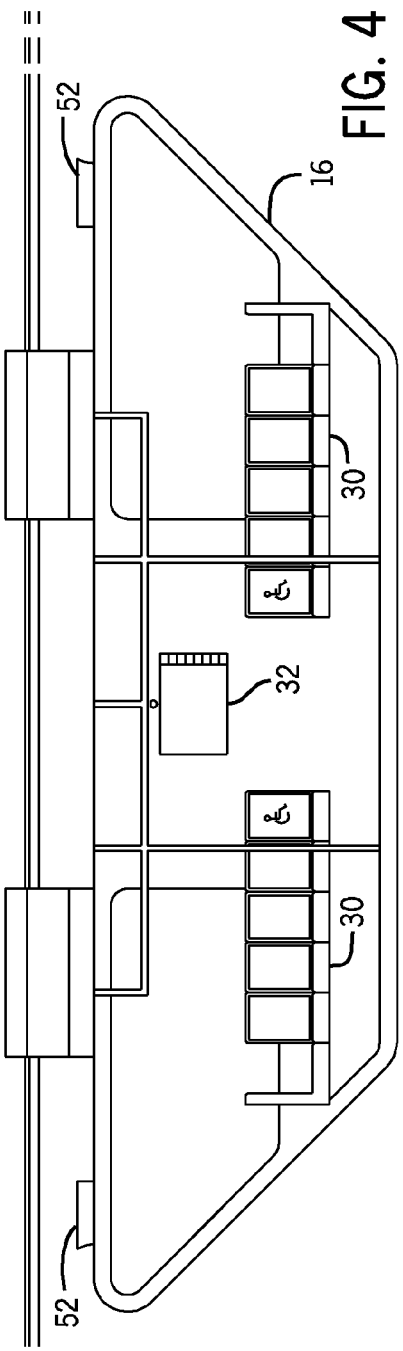
FIG. 4 is a cross-sectional detail view of a transportation kart of the transportation system of FIG. 1.

Referring to FIG. 4, the kart 16 may include a plurality of seats 30. The number of seats and the size of the kart 16 may be varied depending on the transportation needs where the kart 16 is deployed. The kart 16 may also include air conditioning units 52. The kart 16 may also include a touch screen may system 32. In one embodiment, a rider may select a station that they desire the kart 16 to stop. Similar touch screens may be disposed at kart stations, allowing a passenger to select a destination and summon a kart to come to that station to pick up the passenger. Such a touch screen map system 32 system may eliminate the need for karts to travel to stations that do not require a passenger to be picked up or dropped off. The touch screen system 32 may be programmed to use a wide variety of languages and may include tourist mapping and guiding programs, for example.

Referring to FIG. 5, there is shown a schematic view of a portion of the transportation system 10. The ground-level station 60 may be disposed, for example, between two highways 34, 36. Each direction of the highway 34, 36 may include a turn around 35, 37 for accessing the station.

One or more solar cells 62 may be disposed along a sun-facing side of the track 12, as shown in FIG. 5. The solar cells 62 may deliver power, through conventional means, to the karts 16, the computer controllers (not shown) or other electrical systems within the transportation system 10. In one embodiment, the solar energy collected from the solar cells 62 may be stored for future use. The solar cells 62 may be disposed on any component of the transportation system 10 that may be subject to solar rays.

It should be understood, of course, that the foregoing relates to exemplary embodiments of the invention and that modifications may be made without departing from the spirit and scope of the invention as set forth in the following claims.

What is claimed is:

1. A transportation system comprising:
an elevated track formed of at least one suspended I-beam;
a platform adapted to be suspended from the track;
a T-shaped arm extending from the platform;
first and second switcher arms attached to the platform, wherein
the first switcher arm and a first tip of the T-shaped arm is adapted to suspend the platform from a first suspended I-beam of the elevated track; and
the second switch arm and a second tip of the T-shaped arm are adapted to suspend the platform from a second suspended I-beam of the elevated track.

2. The transportation system of claim 1, further comprising a kart attached to the platform, the kart adapted to carry passengers.

3. The transportation system of claim 2, wherein:
the at least one suspended I-beam, the first and second tips of the T-shaped arm and at least a portion of the first and second switcher arms are magnetically charged with the same charge; and
the first and second switcher arms and the T-shaped arm do not physically contact the suspended I-beam of the elevated track.

4. The transportation system of claim 1, further comprising pistons connecting the first and second switcher arms to the platform.

5. The transportation system of claim 4, wherein the switcher arms are deployed in one of a traveling position, wherein the switcher arm is located adjacent to the I-beam, or in a turning position, wherein the switcher arm is pivoted 90 degrees away from the I-beam.

6. The transportation system of claim 5, wherein the switcher arms pivot about a hinge.

7. The transportation system of claim 4, wherein more than one piston independently connects the first and second switcher arms to the platform.

8. The transportation system of claim 1, further comprising at least one solar cell disposed on a component of the transportation system.

9. The transportation system of claim 2, further comprising descending tracks adapted to carry the kart to a ground level station for loading or unloading passengers.

10. The transportation system of claim 2, further comprising a touch screen panel located within the kart, the touch screen panel adapted to receive an input from the passenger to direct the kart to stop at a specific station.

11. A transportation system comprising:
a plurality of overhead tracks suspended from towers, the tracks formed of at least one suspended I-beam;
a plurality of ground-level stations;
a T-shaped arm extending from a platform, the platform adapted to be attached to a top portion of a kart; and
first and second switcher arms attached to the platform, wherein the first switcher arm and a first tip of the T-shaped arm are adapted
to suspend the platform from a first suspended I-beam of the elevated track;
the second switch arm and a second tip of the T-shaped arm are adapted to suspend the platform from a second suspended I-beam of the elevated track; and
the first and second switcher arms and the T-shaped arm do not physically contact the suspended I-beam of the elevated track.

* * * * *